(12) United States Patent
Bentley

(10) Patent No.: US 11,936,741 B2
(45) Date of Patent: Mar. 19, 2024

(54) WORKSPACE DATABASES

(71) Applicant: Bentley Systems, Incorporated, Exton, PA (US)

(72) Inventor: Keith A. Bentley, Elverson, PA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 18/101,221

(22) Filed: Jan. 25, 2023

(65) Prior Publication Data

US 2024/0031443 A1    Jan. 25, 2024

Related U.S. Application Data

(62) Division of application No. 17/869,214, filed on Jul. 20, 2022.

(51) Int. Cl.
*H04L 67/141* (2022.01)
*H04L 67/06* (2022.01)
*H04L 67/1097* (2022.01)

(52) U.S. Cl.
CPC .......... *H04L 67/141* (2013.01); *H04L 67/06* (2013.01); *H04L 67/1097* (2013.01)

(58) Field of Classification Search
CPC .... H04L 67/141; H04L 67/06; H04L 67/1097
See application file for complete search history.

(56) References Cited

U.S. PATENT DOCUMENTS 7,386,797 B1 *  6/2008  Chatterjee .............. G06Q 10/10
                                                          715/965
7,587,467 B2 *  9/2009  Hesselink ............. H04L 67/568
                                                          709/216

(Continued)

FOREIGN PATENT DOCUMENTS

AU    2014249680 B2 *  3/2017  ............. G06F 9/452
CN    101345659 A   *  1/2009

(Continued)

OTHER PUBLICATIONS

"Bentley Building Application Deployment Guide: ProjectWise Managed Workspaces," Bentley Systems, Incorporated, Bentley Building Development Guide, ProjectWise Managed Workspace, Version 1.1, v8i (SELECTseries 1) release, Nov. 2009, pp. 1-38.

(Continued)

*Primary Examiner* — Shean Tokuta
(74) *Attorney, Agent, or Firm* — Cesari and McKenna, LLP; James A. Blanchette

(57) ABSTRACT

In example embodiments, techniques are described for using workspace databases to provide workspace resources to customize sessions of applications. To write workspace resources a backend module of an application may obtain a write lock on a cloud-based blob storage container, and ensure a block of a workspace database to be modified is local in a cloud cache. It may execute one or more database commands to modify the block in the cloud cache, and change an identifier of the block in a local copy of a manifest that includes a list of the blocks of the cloud-based blob storage container. It may further upload the modified block and the local copy of the manifest to the cloud-based blob storage container, wherein the uploaded local copy of the manifest replaces the manifest in the cloud-based blob storage container.

20 Claims, 5 Drawing Sheets

(56) References Cited

U.S. PATENT DOCUMENTS

| | | | |
|---|---|---|---|
| 7,647,614 B2* | 1/2010 | Krikorian | H04N 21/4383 |
| | | | 725/87 |
| 8,139,585 B1* | 3/2012 | Mangal | H04L 65/1104 |
| | | | 370/395.2 |
| 8,549,473 B2 | 10/2013 | Dotan et al. | |
| 9,521,040 B2 | 12/2016 | Vergara et al. | |
| 9,537,894 B1* | 1/2017 | Kuscher | G06F 16/162 |
| 10,530,935 B1* | 1/2020 | Britt | H04M 7/0084 |
| 11,064,047 B1* | 7/2021 | Stegall | G06F 8/61 |
| 11,347,555 B2* | 5/2022 | Lee | G06F 9/5038 |
| 11,425,187 B2* | 8/2022 | Sodagar | H04L 65/80 |
| 11,558,251 B1* | 1/2023 | Luthra | G06F 8/65 |
| 2004/0261076 A1* | 12/2004 | Kondo | G06F 9/5011 |
| | | | 718/100 |
| 2007/0143357 A1* | 6/2007 | Chaudhri | H04L 63/08 |
| 2008/0306976 A1* | 12/2008 | Agbeblewu | G06F 16/284 |
| 2010/0131470 A1* | 5/2010 | Schmidt | H04L 51/04 |
| | | | 707/665 |
| 2012/0197973 A1* | 8/2012 | Tukol | G06F 9/4451 |
| | | | 709/203 |
| 2013/0067388 A1 | 3/2013 | Celie et al. | |
| 2014/0280484 A1* | 9/2014 | Klemenz | H04L 67/02 |
| | | | 709/203 |
| 2015/0088942 A1* | 3/2015 | Shah | G06F 16/196 |
| | | | 707/827 |
| 2015/0319252 A1* | 11/2015 | Momchilov | H04L 67/146 |
| | | | 709/223 |
| 2016/0132314 A1 | 5/2016 | Solsona-Palomar et al. | |
| 2016/0179850 A1* | 6/2016 | Martin | G06F 16/278 |
| | | | 707/634 |
| 2017/0052776 A1* | 2/2017 | Kotian | G06F 21/12 |
| 2017/0090904 A1* | 3/2017 | Shida | G06F 11/0793 |
| 2018/0039453 A1* | 2/2018 | Nakajima | G06F 21/10 |
| 2018/0062956 A1* | 3/2018 | Schultz | H04L 41/0806 |
| 2018/0095739 A1* | 4/2018 | Baset | G06F 8/71 |
| 2020/0019411 A1* | 1/2020 | Nadella | G06F 8/71 |
| 2020/0118303 A1 | 4/2020 | Connelly et al. | |

FOREIGN PATENT DOCUMENTS

| | | | | |
|---|---|---|---|---|
| CN | 103714186 A | * | 4/2014 | G06F 17/30126 |
| CN | 104484195 A | * | 4/2015 | |
| CN | 105593816 A | * | 5/2016 | G06F 11/3003 |
| CN | 106406846 A | * | 2/2017 | |
| CN | 107690615 A | * | 2/2018 | G06F 17/3005 |
| CN | 107844352 A | * | 3/2018 | |
| CN | 109343907 A | * | 2/2019 | |
| CN | 105637481 B | * | 12/2019 | G06F 9/452 |
| CN | 106406846 B | | 2/2020 | |
| CN | 111158788 A | * | 5/2020 | |
| CN | 113692309 A | * | 11/2021 | A63F 3/00895 |
| CN | 113710339 A | * | 11/2021 | |
| CN | 114116064 A | * | 3/2022 | |
| EP | 3401806 A1 | | 11/2018 | |
| JP | 2522898 B2 | * | 8/1996 | |
| JP | 2013186518 A | * | 9/2013 | G06F 8/61 |
| JP | 2020102149 A | * | 7/2020 | |
| JP | 2022036800 A | * | 3/2022 | G06F 9/541 |
| JP | 2018511880 A | * | 4/2023 | |
| KR | 20220061926 A | * | 5/2022 | |
| WO | WO-2019037416 A1 | * | 2/2019 | G06F 9/44505 |
| WO | WO-2021069905 A1 | * | 4/2021 | G06F 8/38 |

OTHER PUBLICATIONS

"Dynamic Managed Workspace: Dynamic Managed Workspace Introduction," Bentley Systems, Incorporated, Bentley Communities, ProjectWise, ProjectWise Design Integration Wiki, Oct. 5, 2021, pp. 1-4.

U.S. Appl. No. 17/869,214, filed Jul. 20, 2022 by Keith A. Bentley for Workspace Databases, pp. 1-28.

U.S. Appl. No. 18/076,922, filed Dec. 7, 2022 by Keith A. Bentley et al. for Serverless Code Service, pp. 1-28.

U.S. Appl. No. 18/097,951, filed Jan. 17, 2023 by Keith A. Bentley for Serverless Property Store, pp. 1-27.

"Workspaces," Bentley Systems, Incorporated, ProjectWise Administrator Online Help, Nov. 4, 2021, pp. 1-51.

"Notification of Transmittal of the International Search Report and the Written Opinion of the International Searching Authority, or the Declaration," International Filing Date: May 30, 2023, International Application No. PCT/US2023/023864, dated Sep. 6, 2023, pp. 1-13.

\* cited by examiner

WORKSPACE DATABASES

RELATED APPLICATIONS

The present application is a divisional of U.S. patent application Ser. No. 17/869,214 filed on Jul. 20, 2022 by Keith A. Bentley and titled "Workspace Databases", the contents of which are incorporated by reference herein in their entirety.

BACKGROUND

Technical Field

The present disclosure relates generally to customizing sessions of software applications, for example, sessions of applications used in a digital twin software architecture.

Background Information

Throughout the design, construction, and operation of infrastructure (e.g., buildings, factories, roads, railways, utility networks, etc.) it is often desirable to create digital twins. Digital twins may federate together data in infrastructure models and other diverse sources, breaking down product/disciple/phase data silos, to produce unified digital representations usable across the lifecycle of infrastructure. A variety of software applications have been developed to allow users to create, modify, view, or otherwise interact with digital twins. Users typically operate such applications during user sessions (or simply "sessions") that begin, for example, when a user executes the application or loads a project therein, and end when the user quits the application or exits the project. Sessions may be read-only sessions (e.g., where a user may simply view a digital twin) or read-write sessions (e.g., where a user may create, modify, or otherwise interact with the digital twin).

A user's experience in a session may be customized based on reference data supplied at runtime that affects aspects of the application's operation. For example, reference data may include specifications, patterns, catalog information or other information that affects interactions with a digital twin. Such reference data may be created by an administrator of the application, the user's organization, the digital twin, and/or an infrastructure model of the digital twin.

However, existing techniques for providing reference data to customize sessions of applications suffer a number of shortcomings. Among other shortcomings, they typically do not organize related workspace resources with a single identity (e.g., they are treated as lose files identified separately), lack version control (e.g., there is only one version), are not readily adaptable between projects (e.g., all or none of the reference data is used), lack fine-grained access permissions (e.g., do not readily discriminate between user groups), lack mechanisms for direct access from the cloud (e.g., must be locally present), suffer from slow access (e.g., require lengthy pre-downloads), have inefficient update procedures, and/or have other shortcomings.

Accordingly, there is a need for improved techniques for providing reference data to customize sessions of applications.

SUMMARY

In example embodiments, techniques are described for using workspace databases to provide workspace resources (reference data) to customize sessions of applications. File-based workspace databases are maintained in workspace files in a local file system. Cloud-based workspace databases are maintained in a cloud-based blob storage container of a storage account of a cloud storage system. Each cloud-based blob storage container may hold multiple cloud-based workspace databases. To use a cloud-based workspace database, a backend module of an application may create an in-memory cloud container object that represents a connection to the cloud-based blob storage container. The in-memory cloud container object may be attached to an in-memory object configured to manage a local cache of blocks of workspace databases. The local cache may be located in an associated directory. Access to the cloud-based blob storage container may be managed by access tokens provided by a container authority of the cloud storage system. Modifications to existing workspace databases or addition of new workspace databases may be performed by administrators using a workspace editor. When the modifications or additions are to a cloud-based workspace database, write access may be managed using write locks. Such workspaces databases and their associated use techniques may allow for efficient organization of workspace resources, versioning, ready adaptation between projects, fine-grained access permissions, direct access without pre-downloading, automatic local caching for fast access, full downloading for offline use, efficient update when modifications are made, and/or a variety of other benefits.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
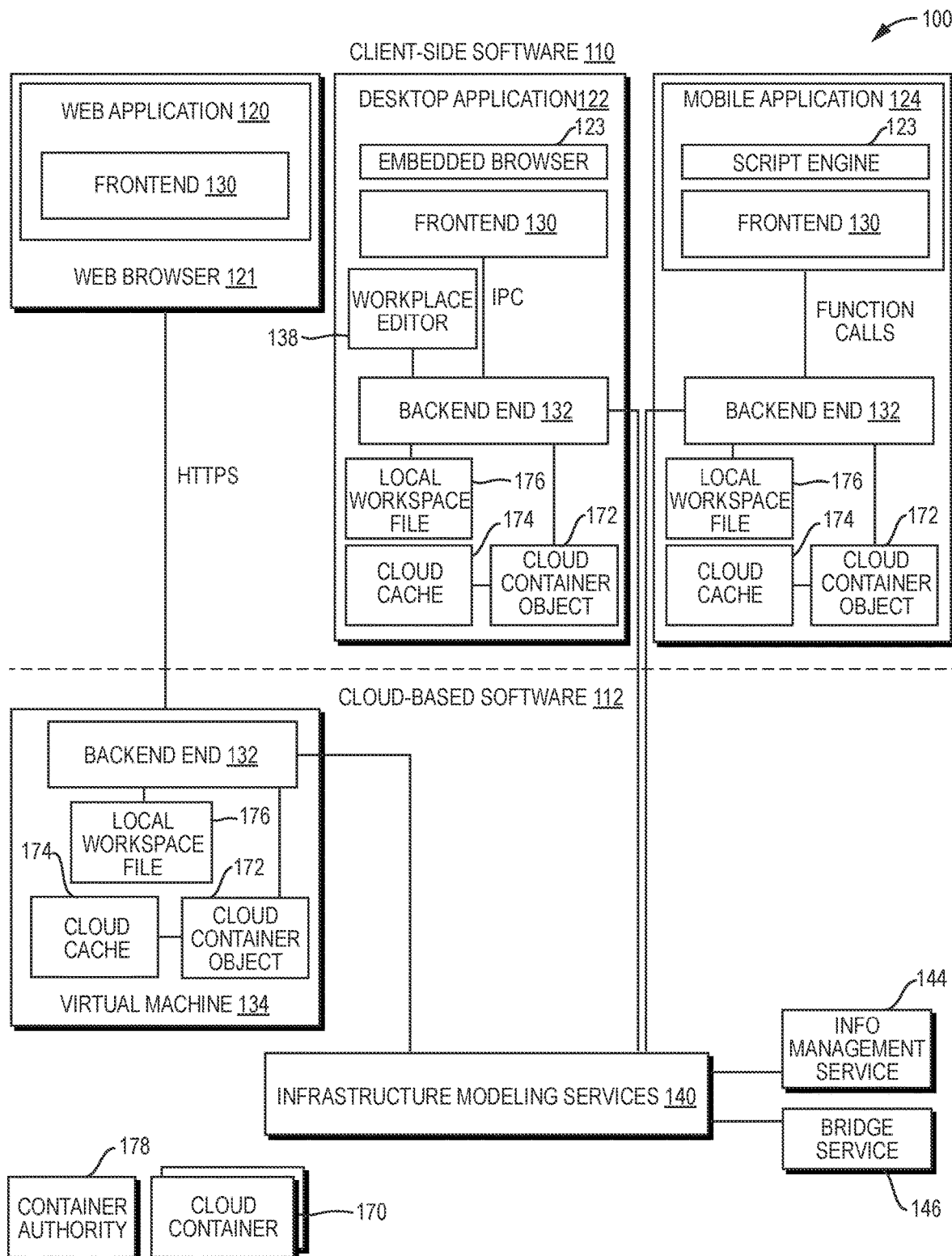
FIG. 1 is a high-level block diagram of an example digital twin software is architecture.

FIG. 1 is a high-level block diagram of an example digital twin software architecture 100. The architecture may be divided into client-side software 110 that executes on one or more computing devices local to an end-user (collectively "client devices") and cloud-based software 112 that is executed on one or more computing devices remote from the end-user (collectively "cloud computing devices") accessible via a network (e.g., the Internet). The client-side software 110 may include web applications 120 that operate within a virtual environment (e.g., a browser sandbox)

provided by a web browser 121 (e.g., a Chrome® web browser), desktop applications 122 that operate under a desktop operating system (e.g., a Windows® operating system) and include an embedded web browser (e.g., a Chromium® browser) 123, and mobile applications 124 that operate under a mobile operating system (e.g., an iOS® or Android® operating system) that include a script engine (e.g., a JavaScript engine) 125. The applications 120, 122, 124 may be functionally divided into frontend modules 130 and backend modules 132, the functions of which are discussed in more detail below.

For each type of application 120, 122, 124, the frontend module 130 is part of client-side software 110. For desktop applications 122 and mobile applications 124, the backend module 132 is also part of client-side software 110, resident on a client device and accessible to the frontend module 122 via inter-process communication (IPC) or function calls. For web applications 120, the backend module 132 is part of cloud-based software 112, executing on a virtual machine 134 on a cloud computing device and communicating with the frontend module 130 via HyperText Transfer Protocol Secure (HTTP).

Infrastructure modeling services 140 may be at the core of the cloud-based software 112. Such services software may provide centralized management and synchronization support for infrastructure models (e.g., iModel® models). The term "infrastructure" refers to a physical structure or object that has been built, or is planned to be built, in the real-world. Examples of infrastructure include buildings, factories, roads, railways, utility networks, etc. The term "infrastructure model" refers to an information container that holds data associated with the lifecycle of infrastructure. Infrastructure models may be a constituent part of a digital twin of infrastructure that federates together data from one or more infrastructure models with data from other sources.

Infrastructure modeling services 140 may interact with a number of other services in the cloud that perform information management and support functions. For example, information management services 144 may manage asset data, project data, reality data, Internet of Things (IoT) data, codes, and other features. Further, bridge services 146 may work together with infrastructure modeling services 140 to permit interoperation with other data sources (not shown), incrementally align data using source-format-specific bridges that know how to read and interpret source data of other formats. A wide variety of additional services (not shown) may also be provided and interact with infrastructure modeling services 140 and the rest of the software architecture 100.

Working with infrastructure modeling services 140, the frontend modules 130 and backend module 132 of applications 120, 122, 124 may access and operate upon data of digital twins, including data included in infrastructure models. Frontend modules 130 may be primarily concerned with data visualization and user interaction. They may access data by making requests to backend modules 132. Backend modules 132 may be primarily concerned with administration, data synchronization, interacting with components of infrastructure models such as elements, aspects, and models, working with local file systems and using native libraries.

As mentioned above, users typically interact with digital twins during sessions of applications 122, 124, 126. Sessions of applications may be customized based on settings and workspace resources configured by administrators of the application, the user's organization, a digital twin currently being used in the application, and/or an infrastructure model currently being used by that digital twin. A "setting" refers to a named parameter (e.g., configurable option) defined by an application but supplied at runtime that affects an aspect of the application's operation. A "workspace resource" refers to named reference data used by an application that affects an aspect of the application's operation. At least some workspace resources may specify settings.

To address problems of prior workspace resource management schemes, the above-described infrastructure modeling software architecture 100 may utilize workspace databases. A "workspace database" refers to a database (e.g., a SQLite database) that holds workspace resources. Some workspace databases may be file-based such that they are held in local workspace files 176 in the local file system of a backend module 132 (e.g., on a client device in the case of a desktop application 122 or mobile application 124, or virtual machine 134 in the case of a web application 120). Such a workspace database may be referred to as a "File Db". Other workspace databases are maintained in a cloud-based blob storage container (also referred to simply as a "cloud container") 170 of a storage account of a cloud storage system (e.g., Microsoft Azure (Azure), Amazon Web Services (AWS), etc.). Such a workspace database may be referred to as a "Cloud Db". Each cloud container may hold multiple Cloud Dbs. To use a Cloud Db of a cloud container 170, a backend module 132 may create an in-memory cloud container object 172 (e.g., on the client device in the case of a desktop application 122 or mobile application 124, or virtual machine 134 in the case of a web application 120) that represents a connection (e.g., a read-only or read-write connection) to the cloud container 170. The cloud container object 172 may be attached to an in-memory object configured to manage a local cache of blocks of workspace databases (referred to as a "cloud cache") 174. The local cache may be located in an associated local directory (e.g., on a temporary disk on the client device in the case of a desktop application 122 or mobile application 124, or virtual machine 134 in the case of a web application 120). Access to a cloud container 170 may be managed by access tokens (e.g., shared access signature (SAS) tokens) provided by a container authority 178 of the cloud storage system. Modifications to existing workspace databases or addition of new workspace databases may be performed by administrators using a workspace editor 138. Where the modifications or additions are to a Cloud Db, write access may be managed using write locks.

Figure 2:
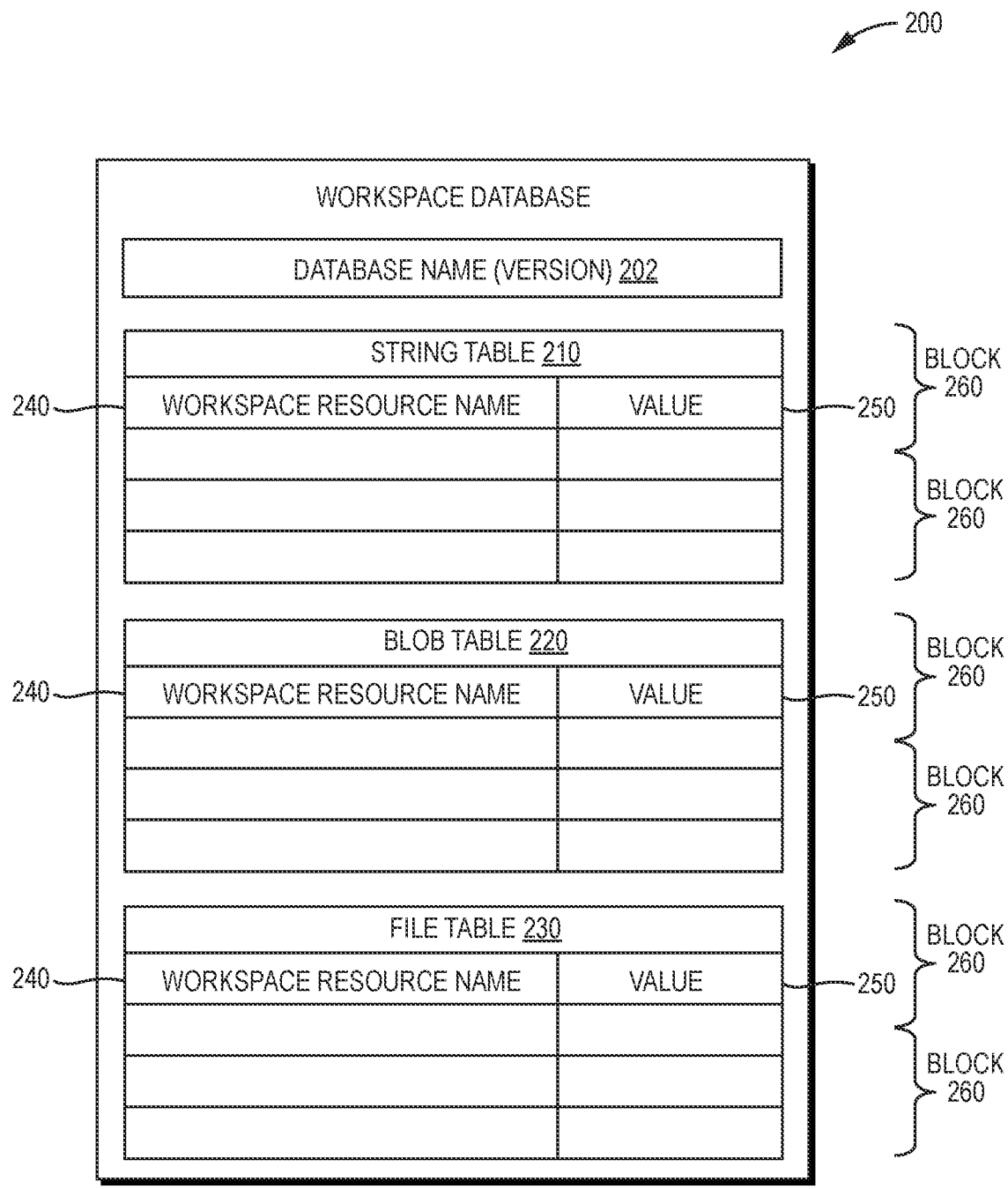
FIG. 2 is a diagram of an example workspace database that may be implemented in the infrastructure modeling software architecture of FIG. 1.

In more detail, FIG. 2 is a diagram of an example workspace database 200 that may be implemented in the infrastructure modeling software architecture 100 of FIG. 1. The workspace database 200 may be a SQLite database having a database name 202 and divided into three tables: a string table 210 that holds strings, a blob table 220 that holds arrays of unsigned (e.g., 8-bit) integers (blobs), and a file table 230 that holds arbitrary files. Each table 210-230 may have a column for a workspace resource name 240 and a column for a value 250. Workspace resource names generally are unique for each resource type, but may be duplicated across types (e.g., a string, a blob, and a file resource in the same workspace database 200 may have the same workspace resource name). Data may be compressed and broken into values in multiple rows of the tables 210-230. For example, data for a file resource may be compressed and broken into multiple rows of the file table 230. Typically, there is no limit on the number of workspace resources that may be held in an workspace database 200. However, it may be preferable to create multiple workspace databases 200 rather than utilize databases of large size to avoid lengthy downloads.

A workspace database 200 may be divided into a number of blocks 260, which are fixed size pieces of the database. Such blocks 260 typically do no span across tables 210-230 (e.g., a block includes entries from just one table). In the case of a Cloud Db, blocks may be considered to be in one of three states. A block may be considered to be in a "remote" state if its contents exist only in the cloud container 170. A block may be considered to be in a "local" state if its contents have been downloaded into the cloud cache 174 and have not been changed, such that they exist in the same form in both the cloud cache 174 and the cloud container 170. A block may be considered to be in a "dirty" state if its contents have been downloaded into the cloud cache 174 and have been changed, such that the copy in the cloud cache 174 differs from that in the cloud container 170.

Optionally, a workspace database 200 may be versioned. A version number that is incremented when contents change may be associated with the workspace database 200, for example, incorporated into the database name 202. The version number may be specified according to a semantic versioning (SemVer) format with portions that indicate major version, minor version, and patch. Typically, a major version is incremented when the content change breaks existing application program interfaces (APIs). A minor version is incremented when APIs may change, but there is backwards compatibility. Likewise, a patch is incremented when there is backwards compatibility and no API changes. By default, an initial version may be marked "1.0.0". While a workspace database 200 may be versioned, individual workspace resources within the workspace database are typically not versioned.

Figure 3:
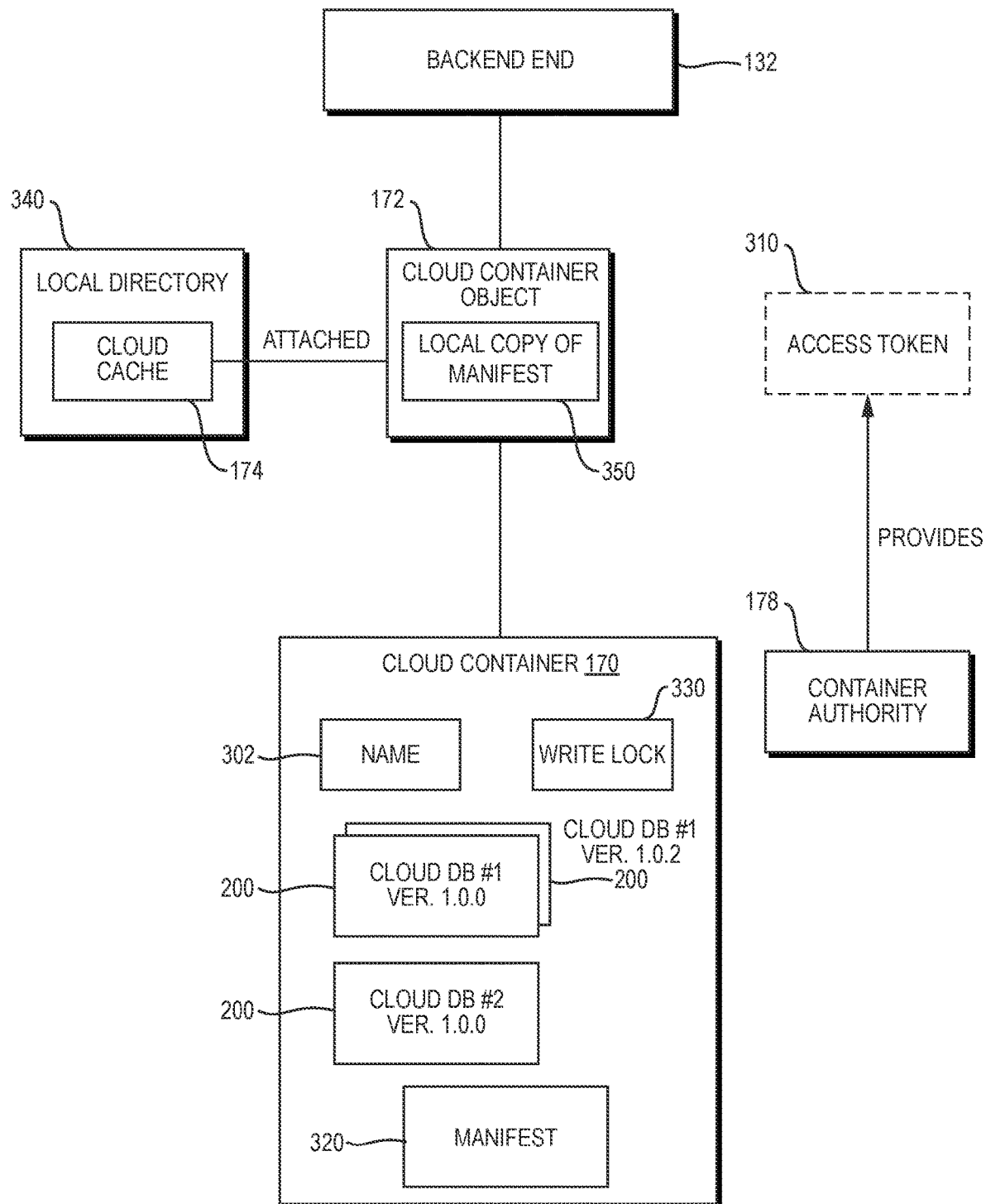
FIG. 3 is a diagram showing relations of an example cloud container of a storage account of a cloud storage system to a cloud container object and cloud cache of a backend module.

FIG. 3 is a diagram showing relations of an example cloud container 170 of a storage account of a cloud storage system to a cloud container object 172 and cloud cache 174 of a backend module 132. While only a single cloud container 170 is shown in this example, it should be remembered that a storage account may store many cloud containers 170.

The cloud container 170 is identified by a container name 302, typically a non-human readable identifier (e.g., a globally unique identifier (GUID) with a prefix or suffix) unique within the storage account. The cloud container 170 may hold multiple Cloud Dbs 200. If versioning is implemented, the multiple Cloud Dbs may include, multiple versions of the same Cloud Db. The cloud container 170 typically also holds a manifest 320 (i.e., a specially named blob) that includes a list of the Cloud Dbs 200 held in the cloud container 170. For each Cloud Db 200 the manifest 320 further includes a list is of its blocks (e.g., identified by a checksum hash of the block's contents). Each cloud container 170 typically also holds a write lock blob 330 used in managing write locks, as discussed in more detail below.

A cloud container object 172 is created by a backend module 132 to allow use of Cloud Dbs 200. The cloud container object 172 represents a read-only or read-write connection to a cloud container 170. The cloud container object 172 may be created using a cloud storage type that indicates a type of the cloud storage system (e.g., Azure, AWS, etc.), a cloud storage account name that indicates the storage account that holds the container, and the container name 302 that identifies the specific container within the storage account. Typically, in order to use a cloud container object 172 to read or write data from the cloud container 170, an access token (e.g., a SAS token) 310 is required from the container authority 178 of the cloud storage system. Use of access tokens may allow for fine-grained access permissions among different users of applications 120, 122, 124. An access token 310 typically provides access for a limited time (e.g., a few hours) and requires a refresh for a session that outlives it. An administrator may provide access tokens 310 to groups of users of applications 120, 122, 124 (e.g., via role-based access control (RBAC) rules). Typically, most users of applications 120, 122, 123 are provided access tokens 310 for read-only access. Only a small set of trusted administrators are typically granted access tokens 310 for read-write access (enabling them to use the workspace editor 138). In some cases, read access may be granted to a few special "public" cloud containers 170 absent any access token 310.

The cloud container object 172 includes a local copy of the manifest 350 of the connected cloud container 170. The local copy of the manifest 350 includes a list of the Cloud Dbs 200 held in the cloud container 170, a list of the block (e.g., identified by a checksum hash of the block's contents) in each Cloud Db 200, and the state of each block (e.g., remote, local, or dirty).

The cloud container object 172 is attached to a cloud cache 174 located in an associated local directory 340 that stores a local copy of at least some of the blocks of the cloud container 170. Typically, the local directory is a unique directory such that each cloud cache 174 has its own directory. A cloud container object 172 generally is attached to only one cloud container 170, but multiple cloud container objects 172 may be attached to the same cloud cache 174. In a first session of an application 120, 122, 124, the cloud cache 174 may be initialized. Blocks may then be downloaded to the initialized cloud cache 174 from the cloud container 170 synchronously as they are accessed, or prefetched from the cloud container 170 asynchronously when there is idle time. In subsequent sessions, already downloaded blocks may be reused. Such an arrangement may allow for initial access without the need for a lengthy pre-download, but also provide fast subsequent access as a result of the local caching. Further, by prefetching all the blocks of a Cloud Db, the database may be accessible even if there is no Internet connectivity, allowing for fully offline use. To prevent consumption of excessive local resources, a cloud cache 174 may be constrained to a maximum size (e.g., 20 Gb).

Figure 4:
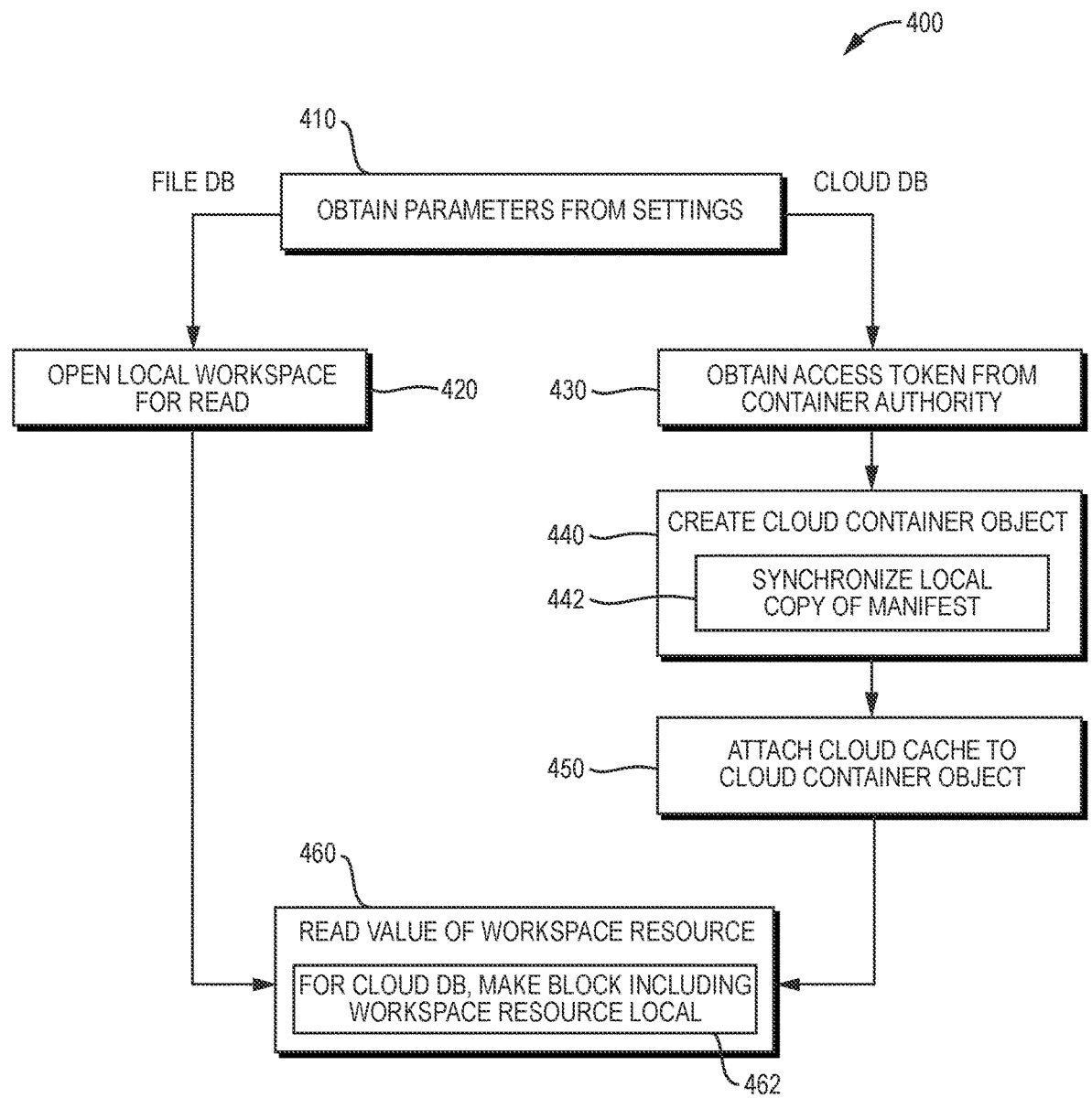
FIG. 4 is a flow diagram of an example sequence of steps for configuring access to, and performing read operations on, a workspace database.

FIG. 4 is a flow diagram of an example sequence of steps 400 for configuring access to, and performing reads operation on, a workspace database. The sequence of steps 400 may utilize a number of parameters. In the case of a File Db, the parameters may include the file name. In the case of a Cloud Db the parameters may include the cloud storage type and cloud storage account name, the container name 302, and the database name 202 (e.g., including the version). At step 410, the backend module 132 obtains the parameters from workspace settings loaded at application startup (e.g., from a JSON string) or as part of an infrastructure model. For a File Db, at step 420, the backend module 132 opens a local workspace file 176 for read access using the file name. For a Cloud Db, at step 430, the backend module 132 obtains an access token (e.g., a SAS tokens) from the container authority 178 of the cloud storage system using the cloud storage type and cloud storage account name. At step 440, the backend module 132 creates a cloud container object 172 that represents a connection to the cloud container 170 using the container name 302. As part of step 440, at sub-step 442, a local copy of the manifest 320 may be created by the cloud container object 172 and synchronized with the manifest 350 of the connected cloud container 170. At step 450, the backend module 132 attaches a cloud cache 174 to the cloud container object 172. If this is the first session, the cloud cache 174 is initialized and begins empty. If this is a subsequent session, there may already be blocks 260 in the cloud cache 174 that were previously downloaded synchronously on access, or asynchronously as part of prefetch operations. At step 460, the backend module 132 reads a value 250 of a workspace resource from the workspace database using a workspace resource name 240. In the case of a File Db, the read is conducted on the local workspace file 176. In the case of a Cloud Db, if the block 260 that includes the workspace resource has already been downloaded to the cloud cache 174, the read is performed locally therefrom. If the block 260 that includes the workspace resource has not already been downloaded to the cloud cache 174, the access token (e.g., SaS token) 310 is utilized to access the cloud container 170, the block downloaded to make it local at sub-step 462, and then the workspace resource is read.

Figure 5:
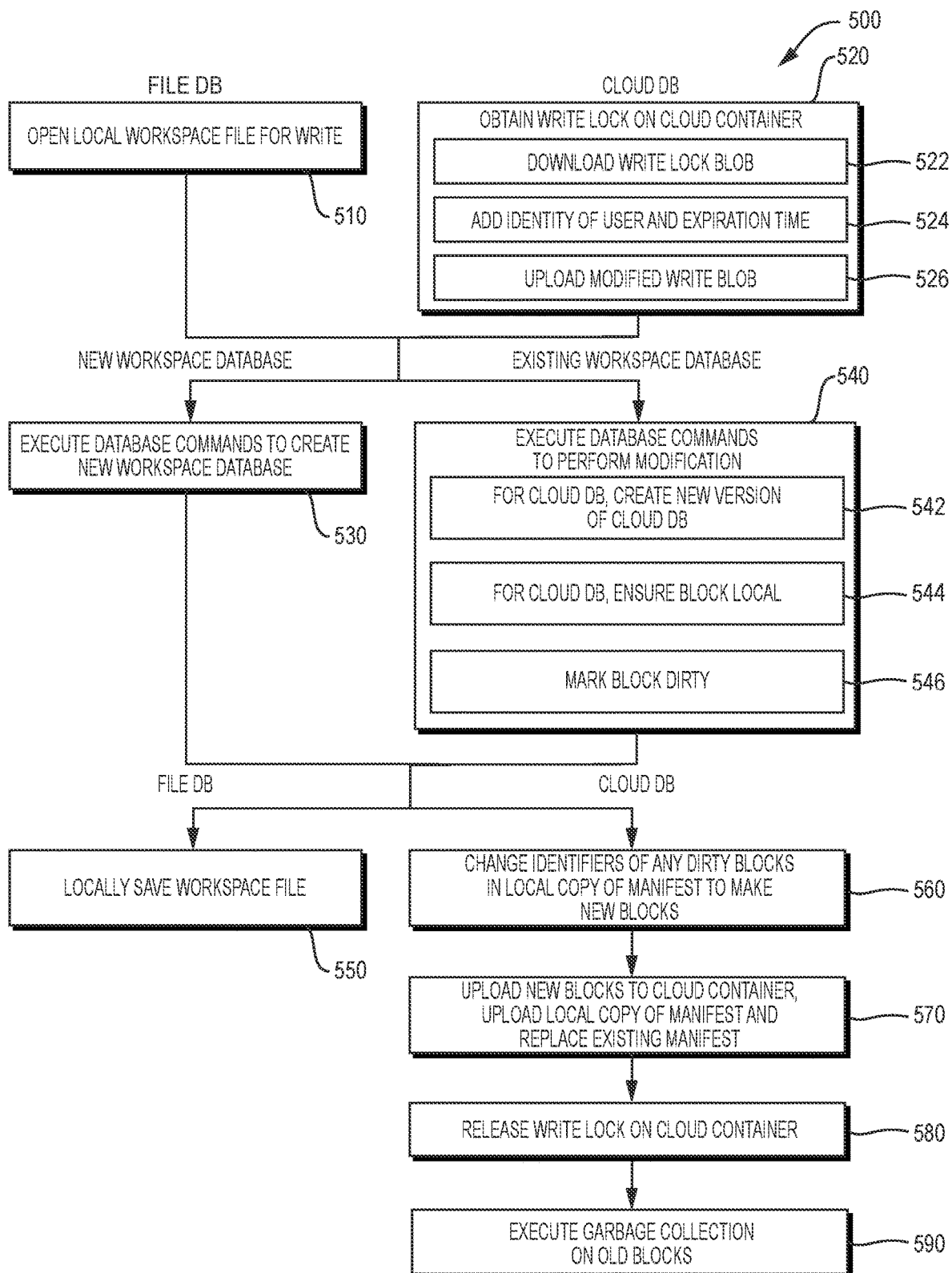
FIG. 5 is a flow diagram of an example sequence of additional steps for performing write operations on a workspace database.

FIG. 5 is a flow diagram of an example sequence of additional steps 500 for performing write operations on a workspace database 200. The sequence of additional step 500 may assume that parameters have already been loaded and, in the case of a Cloud Db, a cloud container object 172 and attached cloud cache 174 have already been created, using operations similar to those set forth above in FIG. 4. For a File Db, at step 510, the backend module 132 opens a local workspace file 176 for write access using the file name. In the case of a Cloud Db, at step 520, in response to input in the workspace editor 138 (e.g., an acquire lock command), the backend module 132 obtains a write lock 330 on the cloud container 172. If another user attempts to obtain a write lock 330 while it is currently held, they are typically denied and provided with a notice of the identity of the current write lock holder. To obtain a write lock 330, the backend module 132, at sub-step 522, downloads a specially named blob (referred to as a "write lock blob") maintained in the cloud container 170. At sub-step 524, the backend module 132 modifies the write lock blob's contents by adding a string that identifies the user and adds an expiration time (e.g., 1 hour). The expiration time may allow other users to eventually obtain write access even if the write lock is not explicitly released. If more time is required, a write lock may be re-obtained. However, if another user instead acquires the write lock, any changes that are still only local are abandoned. At sub-step 526, the backend module 132 uploads the modified write lock blob back to the cloud container 172. The upload may be performed conditionally (e.g., using an HTTP if-match request-type header) so that if more than one module attempts to obtain a write lock 330 simultaneously only one will succeed.

If a new workspace database is to be created, the backend module 132 executes database commands (e.g., SQLite commands) to create a new database. This may be performed in response to input in the workspace editor 138 indicating creation of a new workspace database(e.g., a create database command). In the case of a Cloud Db, as part of step 530, the backend module 132 updates the local copy of the manifest 350 to add blocks of the new Cloud Db to the list of blocks (e.g., computing their checksum hashes and adding these to the list of blocks).

At step 540, if a modification is to be made to an existing workspace database, the backend module executes database commands (e.g., SQLite commands) to make the modification. The database commands (e.g., SQLite commands) may add a new workspace resource, replace an existing workspace resource with another different resource, or delete an existing workspace resource. For a Cloud Db, at sub-step 542, if versioning is employed, a new version of the Cloud Db may be created. This may be performed in response to input in the workspace editor 138 (e.g., a version database command). The backend module 132 may make a copy of the Cloud Db with a new name (e.g., including a new SemVer format version number) by making a new entry in the local copy of the manifest 350 with a duplicate list of blocks. Since the actual blocks are not duplicated (just the list of their names), creating the new version typically consumes negligible computing resources. For a Cloud Db, at step 544, the backend module 132 ensures that each modified block 260 of the Cloud DB is local in the cloud cache 174. Blocks 260 are typically immutable in the cloud container 170 itself and therefore are made local in the cloud cache 174 when they are to be modified. Also, for a Cloud Db, at sub-step 546 the local copy of the manifest 350 is updated to mark the state of each modified block as dirty.

Once all changes are complete (i.e., any modifications to existing workspace databases or creation of new workspace databases is complete), for a File Db the backend module 132 locally saves the workspace file at step 550. For a Cloud DB, at step 560, the backend module 132 changes the identifiers of any dirty blocks in the local copy of the manifest 350 (e.g., by computing new checksum hashes based on the block's new contents). When blocks have been modified their checksum should differ from prior values. The modified blocks with their new identifiers (e.g., checksum hashes) and blocks of any new Cloud Dbs may be considered "new" blocks. It should be noted that, at this point, changes can still be abandoned as the cloud container 170 itself has not yet been modified. In the case of abandonment, the new blocks may be discarded and the local copy of the manifest 350 resynchronized to match the manifest 350 in the cloud container 170.

For a Cloud Db, at step 570, the backend module 132 uploads the new blocks to the cloud container 170 and they are added thereto to be maintained (at least for a time) alongside existing blocks. After all the new blocks have been uploaded, the backend module 132 uploads its local copy of the manifest 350 to the cloud container 170 to replace the manifest 320 in the cloud container 170. This may be performed in response to input in the workspace editor 138 indicating changes in the cloud cache 174 are to be imported to the cloud container 170 (e.g., an import command). Once the operations of step 560 are complete, the new blocks embodying the changes are now identified (e.g., by their checksums) in the list of blocks of the manifest 320 of the cloud container 170. Old blocks (i.e., blocks that were subject to modification) are no longer identified in the list of blocks of the manifest 350 (e.g., because their checksum hashes are no longer present). It should be noted that until upload of the local copy of the manifest 350 the changes were still invisible to other applications 120, 122, 124 of other users. Only after re-synchronizing their local copy of the manifest 350 with the updated manifest 320 of the cloud container 170 are other applications 120, 122, 124 able to see the changes. This re-synchronizing typically occurs periodically (e.g., upon expiration of a retention period). Prior to such time, other applications 120, 122, 124 may continue to use their out-of-date local copy of the manifest 350, and access old blocks already local in their cloud cache 174 or from the cloud container 170. Further, should operations be interrupted after the upload of new blocks but before the upload of the local copy of the manifest 350, there is no issue. The uploaded new blocks will simply not be used (and eventually collected by garbage collection).

For a Cloud Db, at step 580, in response to input in the workspace editor 138 (e.g., a release lock command) the backend module 132 releases the write lock 330 on the cloud container 172. To release the write lock 330, the backend module 132 may remove the string that identifies the user and the expiration time from the write lock blob. Typically, all changes must be uploaded or abandoned before the write lock 330 on the cloud container is released. It should be remembered that if the write lock 330 is not explicitly released, it will eventually still be released when the expiration time expires. In such case, changes may be automatically abandoned.

At step 590, after a period of time sufficient to ensure other applications 120, 122, 124 are no longer using old blocks (e.g., one day), a garbage collection process is executed on the cloud container 170 to delete old blocks that are not identified in the list of blocks of the manifest 350.

In summary, techniques are described herein for creating and utilizing workspace databases. It should be understood that a wide variety of adaptations and modifications may be made to the techniques to suit various implementations and environments. While it is discussed above that many aspects of the techniques may be implemented by specific software processes and modules executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for writing workspace resources for customizing a session of an application, comprising:
   obtaining, by a backend module of the application executing on a computing device, a write lock on a cloud-based blob storage container in a storage account of a cloud storage system, the cloud-based blob storage container storing one or more workspace databases that hold workspace resources, each workspace database divided into one or more blocks;
   ensuring a block of a workspace database to be modified is local in a cloud cache on the computing device, the ensuring to download the block from the cloud-based blob storage container into the cloud cache if the block has not already been made local to the cloud cache;
   executing one or more database commands to modify the block in the cloud cache;
   changing an identifier of the block in a local copy of a manifest that includes a list of the blocks of the cloud-based blob storage container;
   uploading, by the backend module, the modified block and the local copy of the manifest to the cloud-based blob storage container, wherein the uploaded local copy of the manifest replaces the manifest in the cloud-based blob storage container.

2. The method of claim 1, wherein obtaining the write lock further comprises:
   downloading a write lock blob from the cloud-based blob storage container;
   adding an identity of a user of the application and an expiration time to modify the write lock blob; and
   uploading the modified write lock blob back to the cloud-based blob storage container.

3. The method of claim 1, further comprising:
   explicitly releasing the write lock or allowing the expiration time to expire.

4. The method of claim 1, further comprising:
   creating a new version of the workspace database to be modified,
   wherein the modified block is made part of the new version of the workspace database.

5. The method of claim 1, further comprising:
   executing one or more database commands to create a new workspace database in the cloud cache, the creation to modify one or more additional blocks in the cloud cache; and
   updating the local copy of the manifest to reflect the one or more additional modified blocks,
   wherein the uploading uploads blocks of the new workspace database to the cloud-based blob storage container.

6. The method of claim 1, wherein the executing one or more database commands to modify the block in the cloud cache further comprises marking the block as dirty in the local copy of the manifest, and the changing the identifier is in response to the block being marked as dirty.

7. The method of claim 6, wherein the identifier is a checksum hash of the block, and the changing the identifier comprises computing a new checksum hash.

8. The method of claim 1, further comprising:
   maintaining old blocks that are no longer identified in the list of blocks of the manifest in the cloud-based blob storage container; and
   permitting other applications that are using an out-of-date local copy of the manifest to continue to access the old blocks until the other applications resynchronize their local copy of the manifest.

9. The method of claim 8, further comprising:
   periodically executing a garbage collection process on the cloud-based blob storage container to delete old blocks that are not identified in the list of blocks of the manifest.

10. The method of claim 1, wherein the application is a digital twin application and the workspace resources customize a session that uses a digital twin.

11. A non-transitory electronic device readable medium having instructions stored thereon, the instructions when executed by one or more processors of one or more computing devices being operable to:
    obtain a write lock on a cloud-based blob storage container in a storage account of a cloud storage system, the cloud-based blob storage container storing one or more workspace databases that hold workspace resources, each workspace database divided into one or more blocks;
    download a manifest of the cloud-based blob storage container to update a local copy of the manifest;
    ensure a block of a workspace database to be modified is local in a cloud cache at least in part by downloading the block from the cloud-based blob storage container into the cloud cache if the block has not already been made local to the cloud cache;
    execute one or more database commands to add, replace or delete a workspace resource of a workspace database in the cloud cache, the addition, replacement or deletion to modify the block in the cloud cache;
    update the local copy of the manifest to reflect the modified block;
    upload the modified block and the local copy of the manifest to the cloud-based blob storage container, wherein the uploaded local copy of the manifest replaces the manifest in the cloud-based blob storage container; and
    release the write lock.

12. The non-transitory electronic device readable medium of claim 11, wherein the write lock is a write lock blob and the instructions that when executed obtain the write lock comprise instruction that when executed are operable to:
- download the write lock blob from the cloud-based blob storage container;
- add an identity of a user of the application and an expiration time to modify the write lock blob; and
- upload the modified write lock blob back to the cloud-based blob storage container.

13. The non-transitory electronic device readable medium of claim 11, wherein the instructions when executed are further operable to:
- change an identifier of the block in a local copy of a manifest,
- wherein the upload of the updated local copy of the manifest adds the changed identifier to the manifest in the cloud-based blob storage container.

14. The non-transitory electronic device readable medium of claim 13, wherein the identifier is a checksum hash of the block, and the identifier is changed by computation of a new checksum hash.

15. The non-transitory electronic device readable medium of claim 13, wherein the instructions when executed are further operable to:
- maintain old blocks that are no longer identified in the manifest in the cloud-based blob storage container until a garbage collection process is executed.

16. The non-transitory electronic device readable medium of claim 11, wherein the instructions when executed are further operable to:
- create a new version of the workspace database to be modified,
- wherein the modified block is made part of the new version of the workspace database.

17. The non-transitory electronic device readable medium of claim 11, wherein the instructions when executed are further operable to:
- execute one or more database commands to create a new workspace database in the cloud cache, the creation to modify one or more additional blocks in the cloud cache;
- update the local copy of the manifest to reflect the one or more additional modified blocks; and
- upload the one or more additional modified blocks to the cloud-based blob storage container.

18. A computing device configured to write workspace resources for customizing a session of an application, the computing device comprising:
- a processor; and
- a memory coupled to the processor, the memory configured to maintain a cloud cache for storing a portion of one or more workspace databases of a cloud-based blob storage container that hold workspace resources, a local copy of a manifest produced from a manifest in the cloud-based blob storage container, and software for a backend module of the application that when executed on the processor is operable to:
  - download the manifest of the cloud-based blob storage container to update the local copy of the manifest,
  - ensure a block of a workspace database to be modified is local in the cloud cache at least in part by downloading the block from the cloud-based blob storage container into the cloud cache if the block has not already been made local to the cloud cache,
  - execute one or more database commands to add, replace or delete a workspace resource in the cloud cache, the addition, replacement or deletion to modify the block in the cloud cache,
  - update the local copy of the manifest to reflect the modified block, and
  - upload the modified block and the local copy of the manifest to the cloud-based blob storage container, wherein the uploaded local copy of the manifest replaces the manifest in the cloud-based blob storage container.

19. The computing device of claim 18, wherein the computing device is a client device, and the memory of the client device further maintains software for a frontend module of the application.

20. The computing device of claim 18, wherein the computing device is a virtual machine (VM) of a cloud datacenter and the software for the backend module is operable to communicate with a frontend module of the application executed on a client device.

* * * * *

UNITED STATES PATENT AND TRADEMARK OFFICE
CERTIFICATE OF CORRECTION

| | | |
|---|---|---|
| PATENT NO. | : 11,936,741 B2 | Page 1 of 1 |
| APPLICATION NO. | : 18/101221 | |
| DATED | : March 19, 2024 | |
| INVENTOR(S) | : Keith A. Bentley | |

It is certified that error appears in the above-identified patent and that said Letters Patent is hereby corrected as shown below:

In the Specification

Column 5, Line 48:
"further includes a list is of its blocks (e.g., identified by a"
Should read:
--further includes a list of its blocks (e.g., identified by a--

Signed and Sealed this
Twenty-seventh Day of May, 2025

Coke Morgan Stewart
*Acting Director of the United States Patent and Trademark Office*